(12) United States Patent
Blach

(10) Patent No.: US 8,381,618 B2
(45) Date of Patent: Feb. 26, 2013

(54) EXTRUDER GEARING

(76) Inventor: Josef A. Blach, Ehrwald (AT)

( * ) Notice: Subject to any disclaimer, the term of this patent is extended or adjusted under 35 U.S.C. 154(b) by 172 days.

(21) Appl. No.: 12/991,886

(22) PCT Filed: May 2, 2009

(86) PCT No.: PCT/EP2009/003160
§ 371 (c)(1),
(2), (4) Date: Apr. 7, 2011

(87) PCT Pub. No.: WO2009/135625
PCT Pub. Date: Nov. 12, 2009

(65) Prior Publication Data
US 2011/0177901 A1    Jul. 21, 2011

(30) Foreign Application Priority Data
May 7, 2008    (DE) .......................... 10 2008 022 421

(51) Int. Cl.
*F16H 47/00*    (2006.01)
(52) U.S. Cl. .................................. 74/665 GA
(58) Field of Classification Search .............. 74/665 GA
See application file for complete search history.

(56) References Cited

U.S. PATENT DOCUMENTS

| | | | |
|---|---|---|---|
| 4,136,580 A | | 1/1979 | Brand et al. |
| 4,297,917 A | | 11/1981 | Bauer et al. |
| 4,584,903 A | * | 4/1986 | Hirt et al. .................... 74/665 M |
| 4,630,940 A | | 12/1986 | Ostertag et al. |
| 4,679,461 A | * | 7/1987 | Mizuguchi et al. ...... 74/665 GA |
| 4,796,487 A | * | 1/1989 | De Bernardi ............ 74/665 GA |
| 4,899,620 A | * | 2/1990 | Schiffer ....................... 74/665 N |
| 6,106,426 A | | 8/2000 | Morhard et al. |
| 6,318,202 B1 | | 11/2001 | Hahn |
| 2007/0163371 A1 | | 7/2007 | Blach |

FOREIGN PATENT DOCUMENTS

| | | |
|---|---|---|
| DE | 3325782 | 11/1984 |
| DE | 10315200 | 3/2005 |
| DE | 2006052610 | 5/2008 |
| WO | PCT/JP9301039 | 2/1994 |
| WO | WO2007093228 | 8/2007 |

OTHER PUBLICATIONS

International Search Report for PCT/EP2009/003160 mailed Sep. 22, 2009.

* cited by examiner

*Primary Examiner* — Dirk Wright
(74) *Attorney, Agent, or Firm* — Nicholas A. Kees; Godfrey & Kahn, S.C.

(57) ABSTRACT

For driving an extruder (1) having disposed along a circle a plurality of shafts (3) with processing elements (4), the shafts (3) are connected to the output shafts (11) of a gearing (7) which are provided with output pinions (12, 13). The output pinions (12, 13) are disposed axially offset so that adjacent output shafts (11) have a different length (L1, L2) between the end facing the extruder (1) and the output pinion (12, 13). The axially offset output pinions (12, 13) are in engagement each with a sun gear (18, 19). One sun gear (19) is connected to a hollow torque shaft (21) and the other sun gear (18) to an inner torque shaft (22) disposed therewithin. The hollow torque shaft (21) and the inner torque shaft (22) are configured such that the difference in torsional rotation angle caused by the different length (L1, L2) of the output shafts (11) is compensated by a different torsion of the hollow torque shaft (21) and the inner torque shaft (22).

13 Claims, 9 Drawing Sheets

EXTRUDER GEARING

Figure 1:
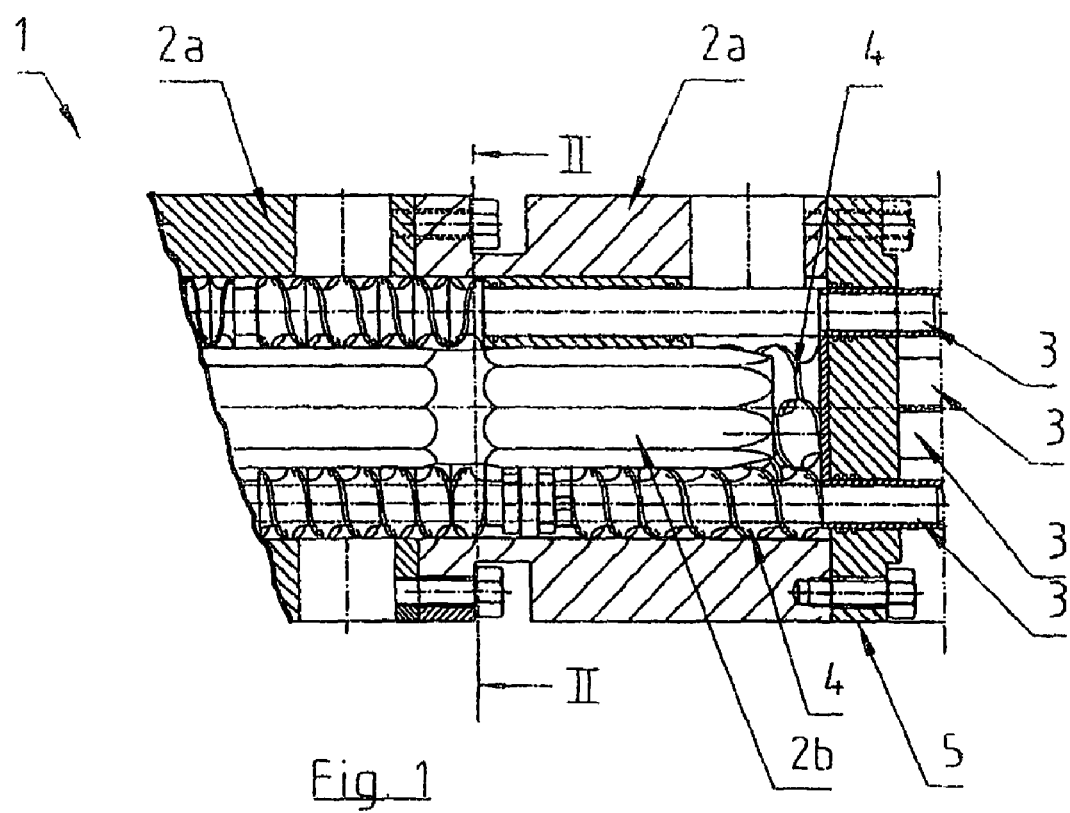

The present invention relates to a gearing for driving an extruder according to the preamble of claim 1.

The advantages in processing substances with twin-screw extruders with tightly intermeshing shafts are indispensable both economically and in terms of process engineering. An important criterion to be considered for assessing the performance potential of such machines is the torque density, i.e. the quotient of torque per shaft to the cube of the center distance. Performance is furthermore determined by rotational speed.

It is further fundamental for the process engineering how the transition of product to the following screw shaft is effected since, depending on whether they are operated in corotation or counterrotation, there are generated in the wedge between the processing elements of two adjacent shafts very different amounts of spreading forces which in turn decisively influence in particular the wear and the rotational speed.

EP 0 962 298 discloses a gearing for a high-performance twin-screw extruder which can be used relatively simply for co- or counterrotating screw shafts after the installation of reversing gearings. Prior art examples of gearings for a counterrotating screw extruder are WO 2007/093228 A1 and EP 9 955 80 B1. DE 33 28 782 C1 describes a gearing for corotating twin-screw extruders in which the drive shaft is disposed coaxially within a hollow shaft and both shafts act as torque shafts which are connected at one end by a gearing, with two axially offset pinions being disposed on the hollow shaft. The gearing according to DE 26 28 387 and PCT/JP 93/01039 is also utilizable only for corotating screw shafts.

In any case the screw shafts must be provided with the highest possible torque through the output shafts of the gearing. At a given center distance the ratio of outside screw diameter (Da) to inside screw diameter (Di) in the process section is to selected as great as possible and the diameter of the output shafts as small as necessary at the maximum permissible torsional stress.

The drive of meshing, in particular tightly meshing, screw shafts furthermore requires an identical, geometric output angular position of the output shafts under all particular load conditions, so that the axial clearance of the screw shafts in the coaxially driven process section can be selected as small as possible without there being any mechanical contact of the screw flanks.

Compared to twin-screw extruders, multi-shaft extruders with a plurality of axially parallel shafts disposed along a circle at equal central-angle intervals have the advantage of exhibiting twice as many wedges in which product is processed particularly effectively upon transfer from screw or other processing elements of one shaft to the next.

DE 103 15 200 B4 already discloses a gearing for such a multi-shaft extruder with corotating shafts according to the preamble of claim 1. A central drive shaft is provided on which the two sun gears meshing with the axially offset output pinions are provided. To increase performance, the input pinions mesh additionally with internally toothed hollow wheels, the hollow wheels being provided with an external toothing with which a drive wheel on an exterior drive shaft meshes so that each hollow wheel is driven with the same torque and the torque of each output pinion is introduced by half via the sun gear and via the hollow wheel.

Known gearings have proved useful in particular with corotating screw shafts in normal cases. However, larger rotational speeds and/or torques cannot be realized therewith since they then either exhibit excessive wear or require excessive clearance in the process section and thus work uneconomically.

It is the object of the invention to provide a gearing for a multi-shaft extruder with tightly meshing processing elements that has high performance potential.

This is achieved according to the invention by the gearing characterized in claim 1. Advantageous embodiments of the invention are stated in the subclaims.

The inventive gearing is suitable as a drive with one or more motors for multi-shaft extruders with tightly meshing, co- or counterrotating shafts which are disposed for force balance in the gearing and optimally upon arrangement in a closed circle also in the process section on a partial circle.

In the inventive gearing the sun gear engaged by the output pinions offset away from the process section is connected nonrotatably to a hollow torque shaft, while the sun gear engaged by the output pinions offset toward the process section is nonrotatably connected to an inner torque shaft which is disposed within the hollow torque shaft coaxially therewith.

The hollow torque shaft and the inner torque shaft are so designed that the difference in torsional rotation angle caused by the different length of the output shafts is compensated by a different torsion of the hollow torque shaft compared to the inner torque shaft. That is, the different torsion of the output shafts is compensated by the different torsion of the hollow torque shaft compared to the inner torque shaft. The difference in torsion of the output shafts is particularly pronounced because they must be of thin configuration due to their small distance apart.

The different torsion of the hollow torque shaft compared to the inner torque shaft can be adjusted for example by the circular ring cross section of the hollow torque shaft compared to the circular cross section of the inner torque shaft preferably configured as a solid shaft.

Thus, an angularly synchronous position of adjacent shafts is ensured at extremely high performance of the gearing not only at partial loads but also at empty and full loads, thereby preventing wear even in the case of tightly meshing processing elements.

The processing elements slipped on the shafts of the process section can be screw or similar conveying elements but also kneader blocks, screw elements with opposite conveying directions, and the like.

The inventive gearing is suitable both for corotating shafts in the process section and for a process section wherein adjacent shafts counterrotate. With corotating shafts the hollow torque shaft and the inner torque shaft are for this purpose drivable in the same direction of rotation at equal angular velocity, while with counterrotating shafts the hollow torque shaft and the inner torque shaft are drivable in opposite directions of rotation at equal angular velocity.

In the case of counterrotating shafts a greater pressure is developed between the processing elements with considerably more material than in the case of corotating shafts. Thus, there occurs between the shafts at equal yield in the case of counterrotating shafts a considerably greater spreading force, which would result in high wear. Therefore, twin-screw extruders with counterrotating shafts have a yield many times lower than that of twin-screw extruders with corotating shafts. On the other hand, counterrotating extruders are necessary for certain, for example highly dispersed, processing tasks or nanoparticle-reinforced plastics.

In an extruder with a plurality of shafts disposed along a circle, however, the spreading forces between adjacent shafts largely cancel each other out. It is thus possible to operate a multi-shaft extruder with the inventive gearing even with counterrotating shafts at high rotational speed and thus yield.

Due to their small distance apart the output shafts of the gearing for the multi-shaft extruder must be configured with an appropriately small diameter. They are therefore loaded to the extreme. A high torque is therefore only attainable when no cross forces act on the output shafts. Therefore, both the output pinions facing the process section and the output pinions facing away from the process section are preferably in engagement not only with the sun gear but also with an internally toothed hollow wheel coaxial with the sun gear, whereby they are driven with the same torque by the internally toothed hollow wheel as by the sun gear. The radial forces acting on the output pinions thus cancel each other out.

A drive of the sun gear and of the internally toothed hollow wheel at equal power can be realized in different ways. For example, two separate motors with corresponding electronic control can drive the sun gear and internally toothed hollow wheel at equal power. Further, it is possible to provide a mechanical coordination between the sun gear and the internally toothed wheel to distribute the torque over the sun gear and the internally toothed hollow wheel in two halves. In this way it is possible to split the power supplied in the particular case or the corresponding torque over the axially offset output pinions proportionately from inside and/or outside.

The zero point positioning is effected in multistage fashion and is first located in the pinion shafts themselves, and in the two gearsets offset away from the process section or toward it which are mechanically connected via the hollow torque shaft and the inner torque shaft which simultaneously each share half of the torque and are positioned at the free ends.

In the case of corotating shafts this can be effected through or via a reduction gear stage and in the case of counterrotating shafts via two gears as a reduction stage which are connected by means of a reversing gearing and/or driven in coordinated fashion by one or two motors.

If a drive of the pinion shafts is effected at the same time via an internally toothed hollow wheel with external toothing as a simultaneous reduction stage, then there is provided in the case of a one-motor drive between motor and each reduction stage a torque shaft which can split and transfer the torque accordingly.

Figure 2:
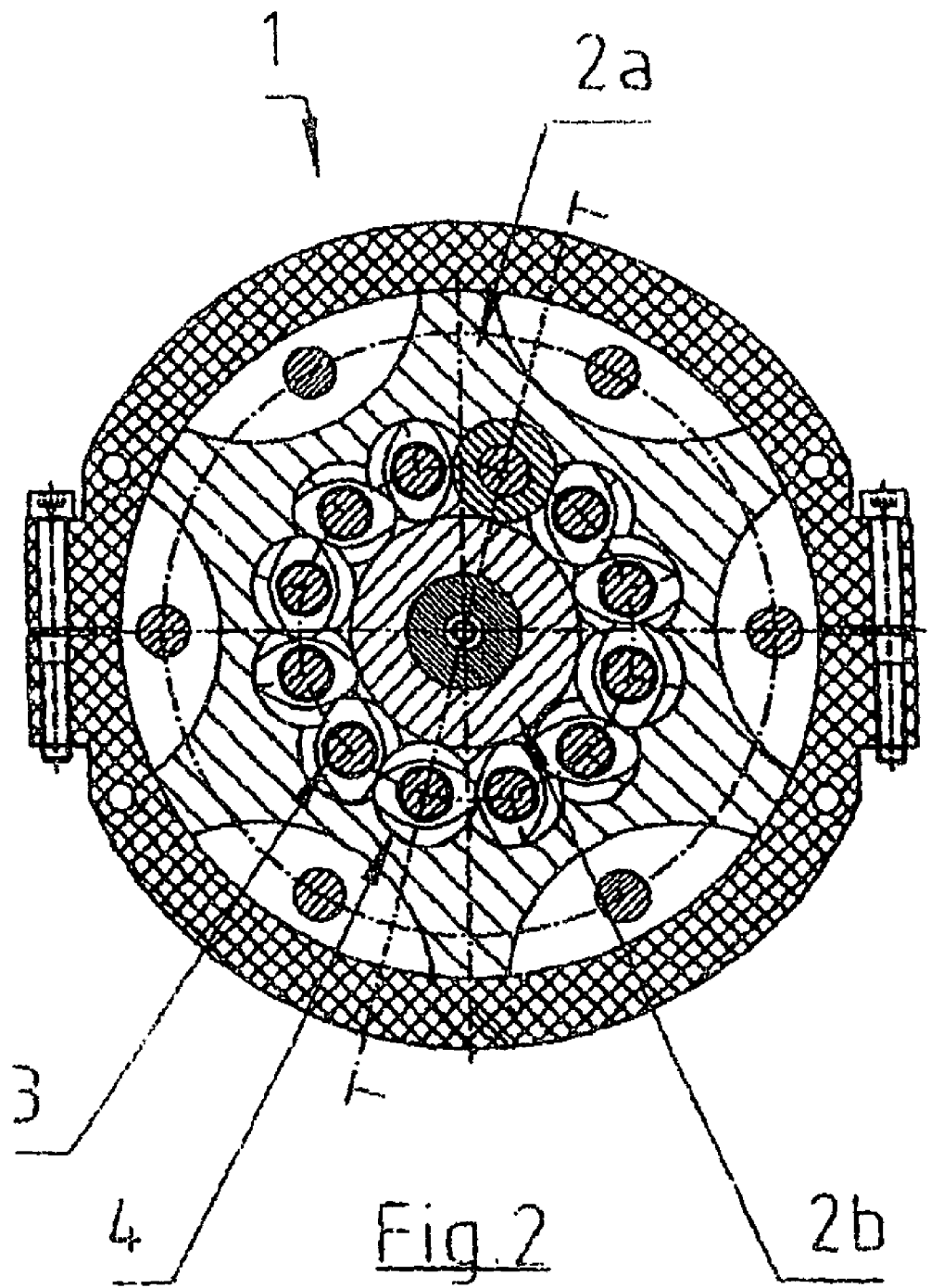
Figure 3:
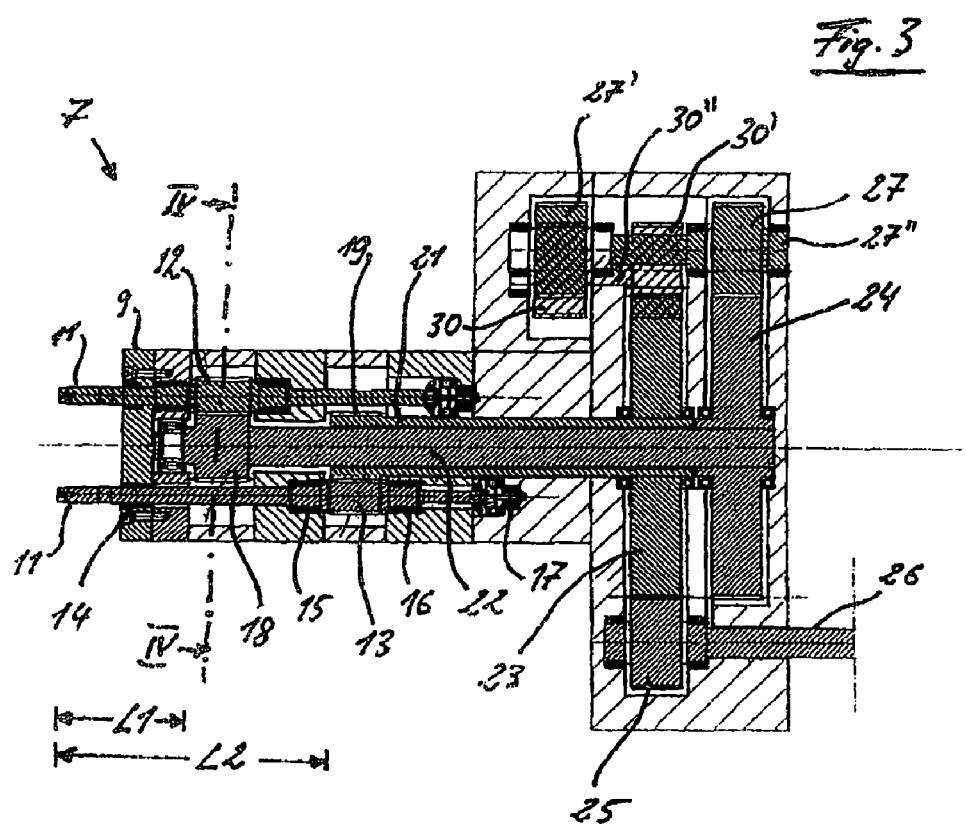
Figure 4:
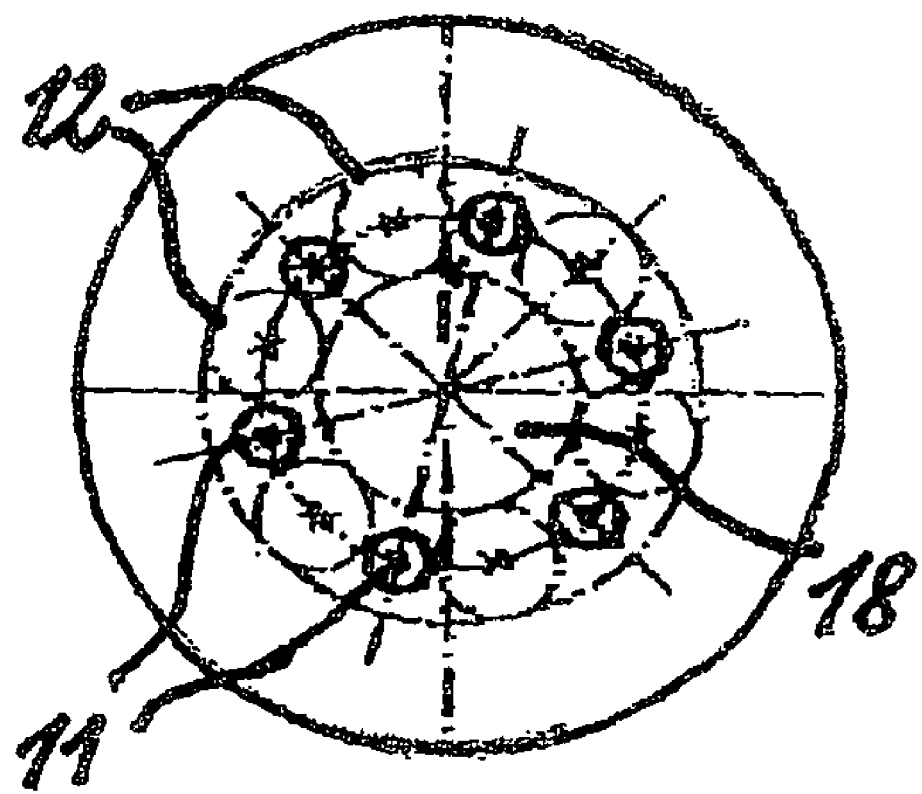
Figure 5:
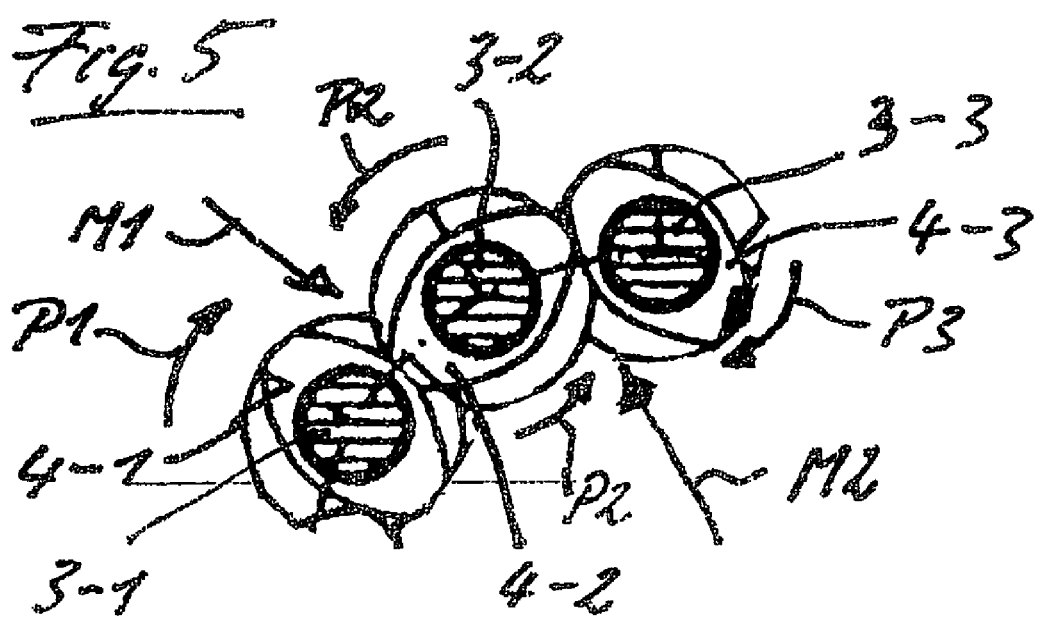
Figure 6:
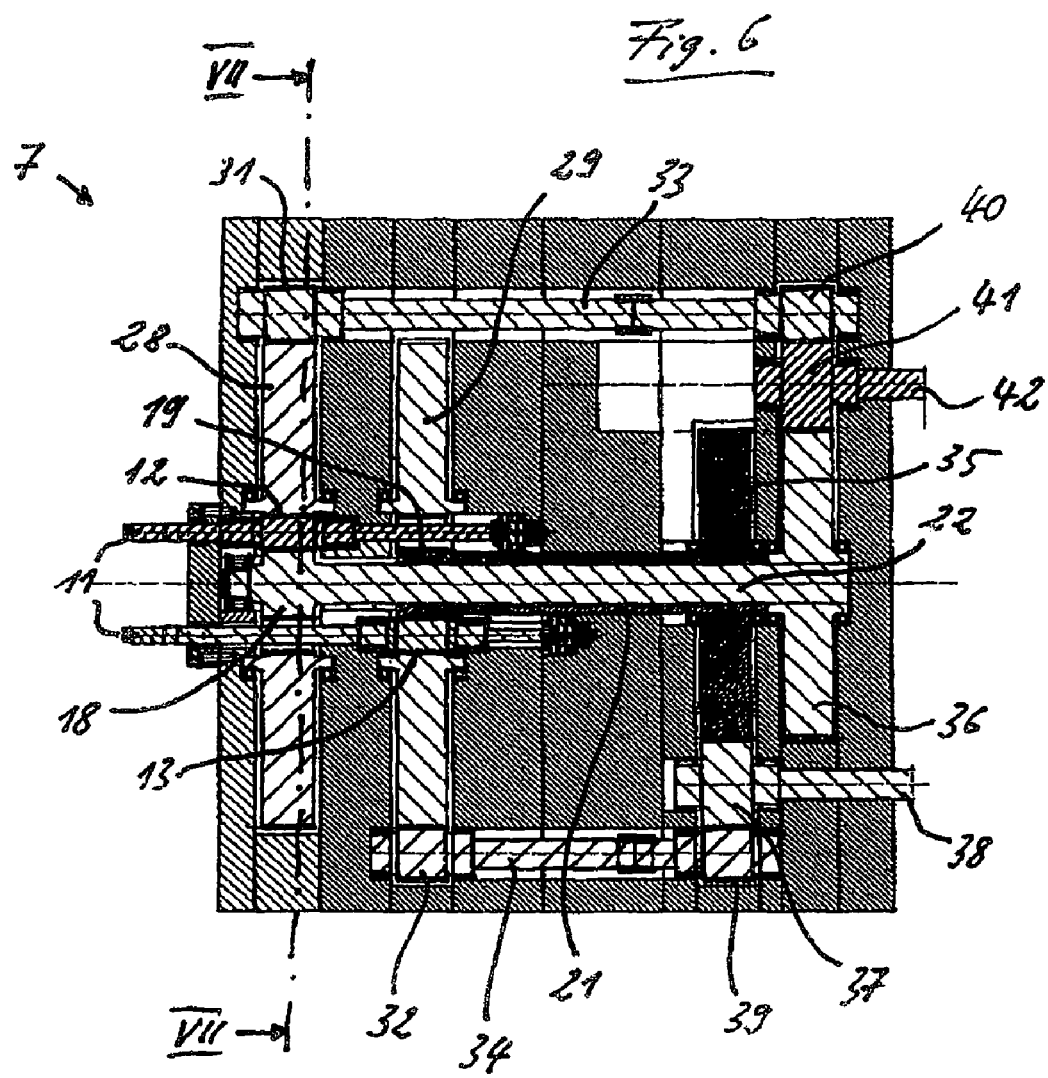
Figure 7:
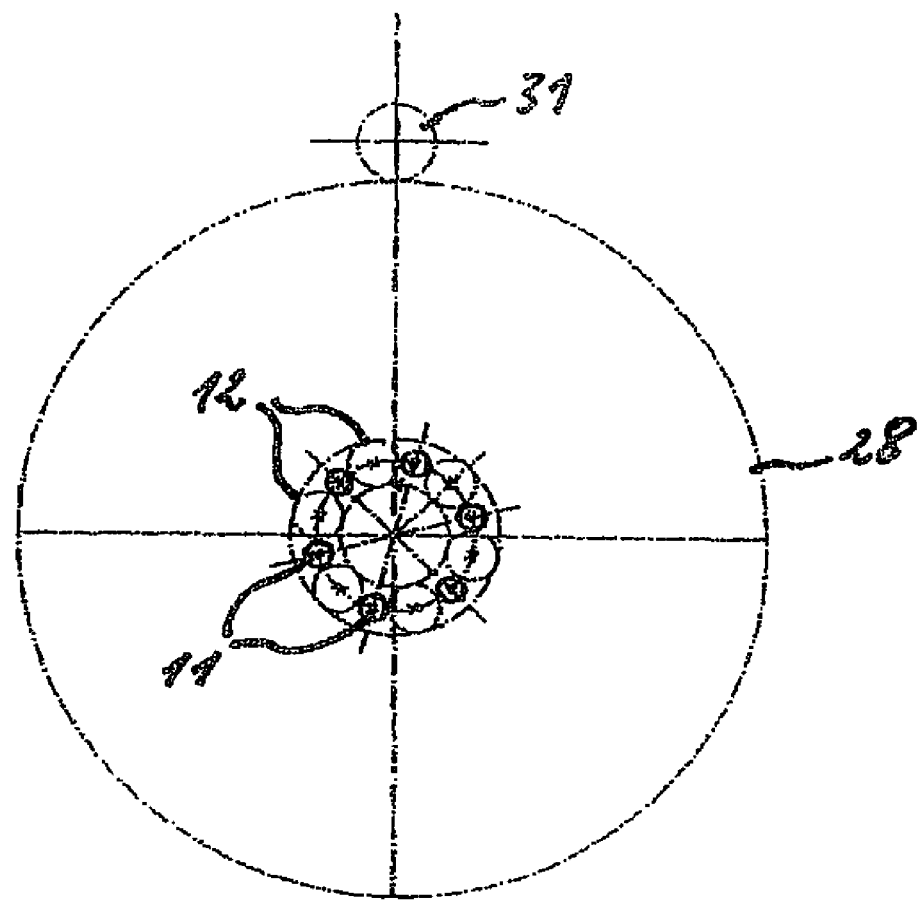
Figure 8:
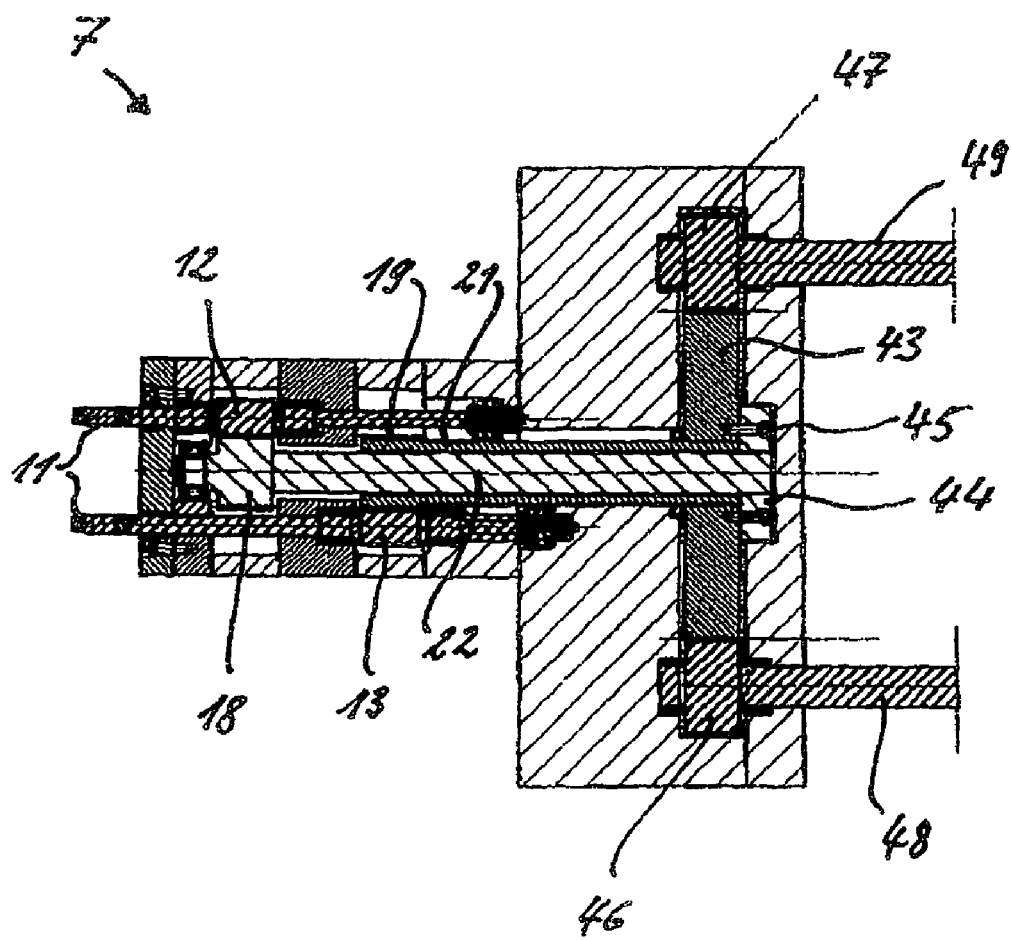
Figure 9:
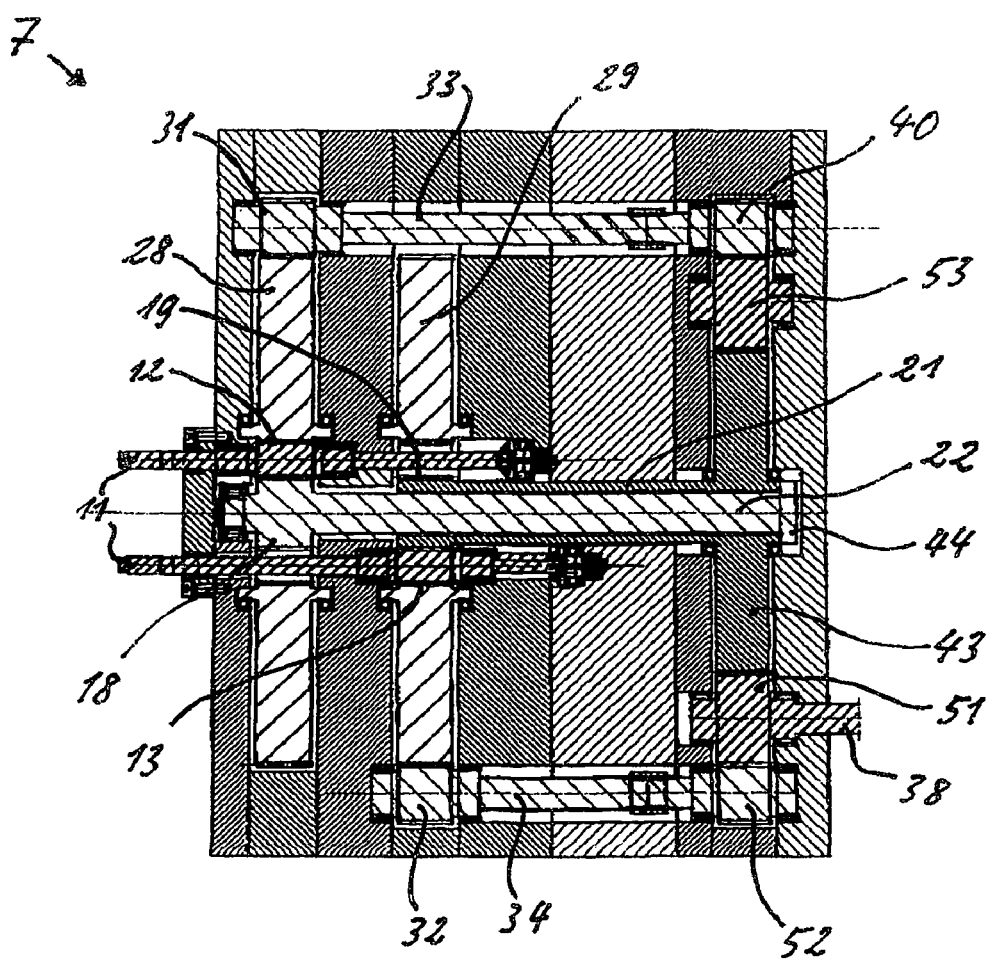

The invention will hereinafter be explained more closely by way of example with reference to the attached drawing. Therein is shown:

FIG. 1 a longitudinal section through the upstream conveying portion of the process section of an extruder;

FIG. 2 a cross section along the line II-II in FIG. 1;

FIG. 3 a longitudinal section through a first embodiment of the gearing for counterrotating shafts with a reversing gearing as well as for one or more motors;

FIG. 4 a cross section along the line IV-IV in FIG. 3;

FIG. 5 an enlarged representation, compared to FIG. 2, of three intermeshing conveying elements on counterrotating shafts;

FIG. 6 a longitudinal section through another embodiment of the gearing for counterrotating shafts and two counterrotating drive motors or by means of reversal of rotation direction of one motor for corotating shafts;

FIG. 7 a cross section along the line VII-VII in FIG. 6;

FIG. 8 a longitudinal section through a first embodiment of the gearing for corotating shafts and two drive motors via a reduction gearing; and FIG. 9 a longitudinal section through a further embodiment of the gearing for corotating shafts with one drive motor and one reduction gearing.

According to FIGS. 1 and 2 the process section 1 of the extruder has in a housing 2a with a core 2b twelve axially parallel shafts 3 disposed along a circle (FIG. 2) at equal central-angle intervals and fitted with processing elements 4, with the processing elements 4 of adjacent shafts 3 intermeshing.

The process section 1 is closed with the end plate 5 on the upstream conveying side. The shafts 3 extend through the end plate 5, being driven in corotation or counterrotation by a torque-splitting gearing 7 according to FIGS. 3 and 4 as well as FIGS. 6 to 9.

The gearing 7 according to FIG. 3 has a plate 9 which is connected to the end plate 5 of the process section 1. Extending out of the plate 9 are twelve output shafts 11 which are nonrotatably connected coaxially to the twelve shafts 3 of the process section 1. The output shafts 11 are nonrotatably connected to output pinions 12, 13. Because of the small center distance between the output shafts 11, the output pinions 12, 13 of adjacent shafts 11 are disposed axially offset. That is, the pinions 12 are disposed offset toward the process section 1 and the pinions 13 away from the process section 1. The output shafts 11 are rotatably mounted at 14, 15, 16 and 17.

The pinions 12 mesh with a sun gear 18 axially offset toward the process section 1, and the pinions 13 with a sun gear 19 axially offset away from the process section 1. While the sun gear 19 is nonrotatably connected to a hollow torque shaft 21, the sun gear 18 is nonrotatably connected to an inner torque shaft 22 configured as a solid shaft and disposed within the hollow shaft 21 coaxially therewith.

The hollow torque shaft 21 and the inner torque shaft 22 are provided in each case at the end facing away from the process section 1 with a gear 23, 24. The gear 23 meshes with a pinion 25 which is disposed nonrotationally on the drive shaft 26 of the gearing 7, said shaft being driven by a motor (not shown). The gear 23 drives the gear 24, thereby driving the hollow torque shaft 21 and the inner torque shaft 22 in counterrotation so that the sun gear 18 facing the process section 1 and the output pinions 12 in engagement therewith, on the one hand, and the sun gear 19 facing away from the process section 1 and the output pinions 13 in engagement therewith, on the other hand, rotate in opposite directions.

Between the gears 23 and 24 there is provided a reversing gearing having the gear 27 which meshes with the gear 24 and is seated together with a gear 27' on the shaft 27", further the gears 30 and 30' on the axially parallel shaft 30", whereby the gears 27' and 30 and the gears 23 and 30' are in mutual engagement. A second drive motor can be connected to the shaft 27".

The length L2 of the output shafts 11 between the end facing the process section 1 and the pinions 13 is substantially larger than the length L1 of the output shafts 11 between the end facing the process section 1 and the pinions 12. The ratio L2:L1 can thus be about 1.5 to 2.5 for example.

This leads to a different rotation angle at the end of the output shafts 11, with the pinions 12, facing the process section 1 compared to the output shafts 11 with the pinions 13. This prevents a rotation angle synchronous position of the processing elements 4 on adjacent shafts 3 of the process section 1 of the extruder when they are driven by the gearing 7, in particular at full load, that is, upon application of high torque or torsional moment on the output shafts 11.

According to the invention, the hollow torque shaft 21 and the inner torque shaft 22 are therefore so configured that the inner torque shaft 22 is subject to greater torsion between the sun gear 18 and the gear 24 than the hollow torque shaft 21 between the sun gear 19 and the gear 23, to such an extent in fact that the greater torsion of the output shafts 11 with the pinions 13 is compensated relative to the torsion of the output shafts 11 with the pinions 12, i.e. the different torsional rotation angle caused by the different length L1, L2 of the output shafts 11 is compensated by the different torsion of the hollow torque shaft 21 compared to the inner torque shaft 22.

Thus, a multi-shaft extruder with very high performance is provided according to the invention, in particular even in counterrotation. For, unlike a twin-screw extruder, the shafts of a multi-shaft extruder are subject to considerably smaller spreading forces due to the mutual force balance between the processing elements, as can be seen in FIG. 5.

In FIG. 5 the direction of rotation of the counterrotating shafts 3-1, 3-2 and 3-3 in the process section 1 of the extruder is shown by the arrows P1, P2 and P3, giving rise to the material feed between the processing elements 4-1, 4-2 and 4-3 as shown by the arrows M1 and M2. As can be seen, this causes the force that the material feed M1 exerts laterally on the shafts 3-1 and 3-2, i.e. the force attempting to spread the shafts 3-1 and 3-2 apart, to be largely canceled out on the shaft 3-2 by the force that the material feed M2 between the shafts 3-2 and 3-3 exerts on the shaft 3-2. What is shown by the example of the shaft 3-2 in FIG. 5 applies to all other shafts 3 of the multi-shaft extruder. The inventive extruder thus possesses a very high yield even in counterrotation.

In the embodiment according to FIGS. 6 and 7, the hollow torque shaft 21 and the inner torque shaft 22 and thus the output shafts 11 with the output pinions 13 and output shafts 11 with the output pinions 12 are likewise driven in opposite directions of rotation.

The output pinions 12 and 13 are in engagement here not only with the sun gear 18, 19 but also with an internally toothed hollow wheel 28, 29, respectively. The pinions 12, 13 are thus driven both by the sun gears 18, 19 and by the radially opposite embracing internally toothed hollow wheel 28, 29, whereby the hollow wheels 28, 29 are for this purpose in turn disposed axially offset accordingly.

Each hollow wheel 28, 29 is provided with an external toothing with which an externally toothed drive gear 31, 32 on exterior drive shafts 33, 34 meshes. It is also possible for a plurality, for example four, exterior drive shafts 33, 34 disposed offset around the circumference of the hollow wheels 28, 29 to be provided in each case.

The hollow torque shaft 21 is provided for its drive with a gear 35, and the inner torque shaft 22 with a gear 36.

The gear 35 is in engagement with a pinion 37 which is seated nonrotationally on a first drive shaft 38 which is driven by a first motor (not shown). At the same time, the pinion 37 is in engagement with a gear 39 which is disposed nonrotationally on the exterior drive shaft 34 in order to drive the hollow wheel 29 via the drive gear 32.

On the other hand, the gear 36 is in engagement with a pinion 41, which is seated nonrotationally on a second drive shaft 42 which is driven by a second motor (not shown). At the same time, the pinion 41 is in engagement with the gear 40 which is disposed nonrotationally on the exterior drive shaft 33 in order to drive the hollow wheel 28 via the drive gear 31.

With the gearing according to FIGS. 6 and 7 the hollow torque shaft 21 and the inner torque shaft 22 can also be driven in the same direction of rotation instead of in opposite directions of rotation. For this purpose, the drive shafts 38 and 42 need only rotate in opposite directions of rotation instead of in the same direction of rotation.

On the other hand, the hollow torque shaft 21 and the inner torque shaft 22 are only drivable in the same direction of rotation in the embodiment according to FIG. 8.

Here, the hollow torque shaft 21 is nonrotatably connected at the end facing away from the process section 1 to a gear 43.

Further, a nonrotatable connection is provided at the end facing away from the process section 1 between the hollow torque shaft 21 and the inner torque shaft 22. For this purpose there is provided at the end of the inner torque shaft 22 a flange 44 which is fastened with screw bolts 45 to the gear 43 nonrotatably connected to the hollow torque shaft 21.

The gear 43 meshes with pinions 46, 47 which are seated on drive shafts 48, 49 which are driven by one or two motors (not shown).

The embodiment according to FIG. 9 is likewise intended for corotating operation, i.e. a gearing wherein the hollow torque shaft 21 and the inner torque shaft 22 are driven in the same direction of rotation.

As in the embodiment according to FIG. 8, the hollow torque shaft 21 is nonrotatably connected here at the end facing away from the process section 1 to a gear 43, whereby for connecting the hollow torque shaft 21 to the inner torque shaft 22 there is again provided at the end of the inner torque shaft 22 a flange 44 which is fastened nonrotationally to the gear 43 nonrotatably connected to the hollow torque shaft 22.

To eliminate the radial forces acting on the output pinions 12, 13 there are provided in the embodiment according to FIG. 9, in conformity with the embodiment according FIG. 6, internally toothed hollow wheels 28, 29 in which the pinions 12, 13 additionally mesh, further drive gears 31, 32 on exterior drive shafts 33, 34 which mesh with the external toothing of the hollow wheels 28, 29.

Unlike the embodiment according to FIG. 6, however, there is provided only the one drive shaft 38 which is driven by a motor (not shown).

For this purpose, the pinion 51 which is seated on the one drive shaft 38 meshes with the gear 43, on the one hand, and with the gear 52 on the exterior drive shaft 34, on the other hand, via which the internally toothed hollow wheel 29 is driven with which the output pinions 13 are in engagement.

At the same time, the gear 43 is in engagement with the reversing gearing 53 which meshes with the pinion 40 on the exterior drive shaft 33 via which the internally toothed hollow wheel 28 is driven with which the output pinions 12 are in engagement.

The invention claimed is:

1. A gearing for driving an extruder having a process section with a plurality of axially parallel shafts disposed along a circle at equal central-angle intervals and nonrotatably connected to processing elements with which adjacent shafts intermesh, the gearing having output shafts which are nonrotatably connected coaxially to the shafts of the process section, each output shaft having an output pinion, adjacent output shafts having, through axial offset of their output pinions, a different length between the end facing the process section and the output pinion, the output pinions offset toward the process section or away therefrom being in engagement with one sun gear in each case, and each sun gear being connected to a drive shaft, characterized in that the drive shaft with the sun gear offset away from the process section is formed by a hollow torque shaft, and the drive shaft with the sun gear offset toward the process section by a coaxial inner torque shaft disposed within the hollow torque shaft, the hollow torque shaft and the inner torque shaft being configured such that the difference in torsional rotation angle caused by the different length of the output shafts is compensated by a different torsion of the hollow torque shaft and the inner torque shaft.

2. The gearing according to claim 1, characterized in that the hollow torque shaft and the inner torque shaft are drivable in the same or opposite directions of rotation at equal angular velocity.

3. The gearing according to claim 2, characterized in that the hollow torque shaft and inner torque shaft drivable in the same direction of rotation are provided at the end facing away from the process section with a common gear or with one gear in each case.

4. The gearing according to claim 3, characterized in that the hollow torque shaft and inner torque shaft provided with a common gear are interconnected nonrotationally at the end facing away from the process section.

5. The gearing according to claim 4, characterized in that the common gear is connected nonrotationally to the hollow torque shaft, and the inner torque shaft has a flange which is nonrotatably connected to the gear.

6. The gearing according to claim 2, characterized in that the hollow torque shaft and inner torque shaft drivable in opposite directions of rotation are provided with one gear in each case.

7. The gearing according to claim 1, characterized in that the output pinions facing the process section and the output pinions facing away from the process section are in each case in engagement both with the sun gear and with a coaxial internally toothed hollow wheel.

8. The gearing according to claim 1, characterized in that the torque is supplied to the output pinions facing the process section and those facing away from the process section by the sun gear or the sun gear and the internally toothed hollow wheel in proportionately split fashion.

9. The gearing according to claim 7, characterized in that the torque is supplied to the output pinions facing the process section and those facing away from the process section by the sun gear or the sun gear and the internally toothed hollow wheel in proportionately split fashion.

10. The gearing according to claim 1, characterized in that the zero point positioning at the end of the output shafts connected to the shafts of the process section is adapted to be coordinated by form closure or force closure, mechanically and/or electrically.

11. The gearing according to claim 2, characterized in that in the case of output shafts drivable in the same direction of rotation the mechanical torque split is adapted to be coordinated via an electrical shaft.

12. The gearing according to claim 8, characterized in that in the case of output shafts drivable in the same direction of rotation the mechanical torque split is adapted to be coordinated via an electrical shaft.

13. The gearing according to claim 1, characterized in that the output pinions facing the process section and the output pinions facing away from the process section are driven via one motor in each case.

* * * * *